US012505186B1

(12) United States Patent
Holland et al.

(10) Patent No.: US 12,505,186 B1
(45) Date of Patent: Dec. 23, 2025

(54) IDENTITY PROVIDER (IDP) AGNOSTIC AUTHENTICATION ENFORCEMENT

(71) Applicant: CLOUDFLARE, INC., San Francisco, CA (US)

(72) Inventors: Alexander Jay Holland, Ann Arbor, MI (US); James Howard Royal, Austin, TX (US); Kenneth A. Johnson, Austin, TX (US); Shahed El Baba, Windsor (CA)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 19/227,264

(22) Filed: Jun. 3, 2025

(51) Int. Cl.
*H04L 9/40* (2022.01)
*G06F 21/31* (2013.01)
*H04L 9/32* (2006.01)

(52) U.S. Cl.
CPC ...... *G06F 21/31* (2013.01); *G06F 2221/2103* (2013.01); *H04L 9/3271* (2013.01); *H04L 9/40* (2022.05); *H04L 63/08* (2013.01); *H04L 63/0815* (2013.01); *H04L 63/083* (2013.01); *H04L 63/0861* (2013.01); *H04L 63/0884* (2013.01)

(58) Field of Classification Search
CPC ............ G06F 21/31; G06F 2221/2103; H04L 9/3271; H04L 9/40; H04L 63/0815; H04L 63/083; H04L 63/0884
See application file for complete search history.

(56) References Cited

U.S. PATENT DOCUMENTS

| 12,052,232 B2 * | 7/2024 | Barbe ................ H04L 9/0825 |
| 2014/0173697 A1 | 6/2014 | Barbir |
| 2015/0215315 A1 | 7/2015 | Gordon et al. |

(Continued)

OTHER PUBLICATIONS

"Selecting Secure Multi-Factor Authentication Solutions"—National Security Agency, Sep. 2020 https://media.defense.gov/2024/Jul/31/2003515137/-1/-1/0/MULTIFACTOR_AUTHENTICATION_SOLUTIONS_UOO17091520.PDF (Year: 2020).*

(Continued)

*Primary Examiner* — Randy A Scott
(74) *Attorney, Agent, or Firm* — NICHOLSON DE VOS WEBSTER & ELLIOTT LLP

(57) ABSTRACT

An intermediary server operates an application proxy. An access request is received for access to an application, where an access policy is associated with the application that specifies authentication method(s) acceptable for satisfying an authentication requirement enforced by the application proxy. The user agent is redirected to submit an authentication request to an identity provider for identity verification. An authentication response generated by the identity provider is received and includes information that specifies authentication method(s) used during the identity verification. If the authentication method(s) used during the identity verification match the authentication method(s) acceptable for satisfying the authentication requirement, the user will not be prompted to perform those authentication method(s) and the authentication requirement enforced by the application proxy is met. If they do not match, the user will be prompted to perform the authentication method(s) as a condition to access the application.

21 Claims, 6 Drawing Sheets

(56) References Cited

U.S. PATENT DOCUMENTS

| | | |
|---|---|---|
| 2016/0065563 A1 | 3/2016 | Broadbent et al. |
| 2016/0156592 A1 | 6/2016 | Walters et al. |
| 2017/0063836 A1 | 3/2017 | Cui |
| 2019/0089676 A1 | 3/2019 | Gigov et al. |
| 2021/0266306 A1 | 8/2021 | Furman et al. |
| 2022/0201001 A1 | 6/2022 | Yang et al. |
| 2024/0054209 A1* | 2/2024 | Simakov ................. G06F 21/46 |

OTHER PUBLICATIONS

"A Practical Approach to Protocol-Agnostic Security for Multiparty Online Services"—Chen et al., Microsoft Research, May 22, 2014 https://www.microsoft.com/en-us/research/wp-content/uploads/2016/02/Certified-Symbolic-Transaction-full.pdf (Year: 2014).*

Khalid, Umer, et al. "Cloud based secure and privacy enhanced authentication & authorization protocol." Procedia Computer Science 22 (2013): 680-688. (Year: 2013).

Rhea, Sam, "Cloudflare Access: now for SaaS apps, too", The Cloudflare Blog, Cloudflare, Oct. 13, 2020, 16 pages, downloaded at: https://blog.cloudflare.com/cloudflare-access-for-saas/.

Jones et al., "Authentication Method Reference Values", Request for Comments: 8176, Jun. 2017, 15 pages.

\* cited by examiner

IDENTITY PROVIDER (IDP) AGNOSTIC AUTHENTICATION ENFORCEMENT

FIELD

Embodiments of the invention relate to the field of network security; and more specifically, to an identity provider agnostic authentication enforcement.

BACKGROUND

Access to an application typically requires authentication and authorization. Authentication confirms the identity of the user to ensure the user is who they claim to be. Authorization determines whether the authenticated user has permission to access a specific application or resource. Authentication factors can be categorized into three types: something you know (e.g., knowledge-based factors such as a password, PIN, or passphrase), something you have (e.g., possession-based factors such as a hardware token, a smartphone, a cryptographic security key), and something you are (e.g., biometrics such as fingerprint, face recognition, or voice recognition). Authentication is conventionally performed by verifying the user's identity against a directory, such as one provided by an identity provider. Many user authentication systems prompt for a username and password. Multi-factor authentication (MFA) requires multiple authentication mechanisms, typically combining something you know (e.g., a password) with another authentication factor such as text-based authentication, email-based authentication, authenticator applications, push notifications, biometric authentication, hardware tokens, security questions, smart cards, behavioral biometrics, and geolocation.

An application may be protected by an application proxy. An application proxy is an intermediary service that sits between a client and an application that enforces controlled access to the application. An application proxy protects and manages access to an application, often in a zero-trust environment. An application proxy often relies on an external identity provider (IdP) for authentication. The external IdP has their own requirements for authentication including whether, and what types, of MFA methods are supported.

It is difficult to configure a per application MFA policy with a conventional application proxy. For instance, at the identity provider, a customer may be able to configure an MFA policy that is applied to the application proxy itself but not to the application(s) protected by the application proxy. This means that the same MFA policy is generally applicable to each application protected by the application proxy.

Step-up authentication refers to the process of requiring an additional authentication, typically a stronger authentication method, when a user attempts to perform a high-risk action or access sensitive data. Conventional application proxies cannot perform step-up authentication. This is due to the reliance on the identity provider for MFA management. If the application proxy wanted to initiate an additional MFA prompt, it would redirect back to the identity provider which would likely recognize the existing session as valid without triggering the additional MFA prompt.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
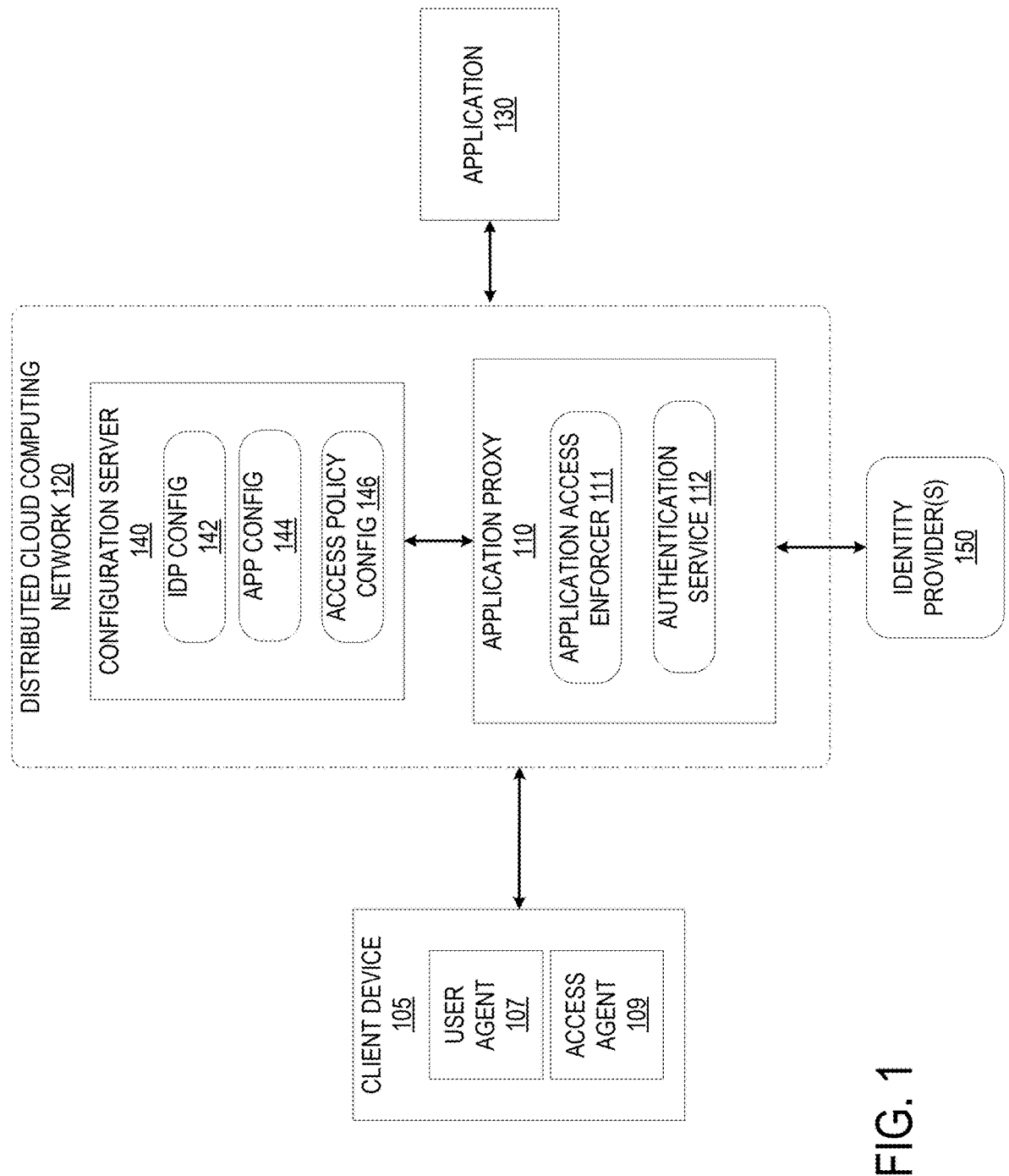
FIG. 1 illustrates an exemplary system for IdP agnostic authentication enforcement according to an embodiment.

An identity provider (IdP) agnostic authentication enforcement is described. The IdP agnostic authentication enforcement requires one or more authentication methods, which can be configured, to access an application. The IdP agnostic authentication enforcement is provided through a service that operates an application proxy. The application proxy sits between users and applications and can enforce access policies for accessing the applications. A customer of the application proxy service can configure the one or more authentication methods that are acceptable for satisfying the authentication requirement to the application.

The application proxy enforces the IDP agnostic authentication requirement to the application. A customer can define a policy that specifies one or more authentication methods acceptable for satisfying an authentication requirement for accessing an application, where these authentication methods are enforced at the application proxy. This policy can apply to users associated with the customer, such as employees, contractors, organizational members, guest users, or service accounts. The authentication requirement may require multiple authentication methods be performed (e.g., multifactor authentication such as a password authentication method and an authenticator application time-based one-time password). As another example, the authentication requirement may require a single authentication method where the single authentication method is phishing-resistant (e.g., a passkey). A customer can define different policies for different applications with different authentication requirements. For example, a customer can require a specific one or more authentication methods to access a specific application. The policy can also apply rule(s) such as a behavioral risk score, location, client device type, user agent type, device posture, whether the request is from a managed device, and session duration (e.g., the duration of the authentication session).

Example authentication methods that can be enforced include: one-time password (OTP) sent via text message, voice call OTP, email-based OTP, authenticator application time-based OTP (TOTP), push notification, hardware token OTP, security key (e.g., using WebAuthn), biometric authentication (e.g., using WebAuthn), and smart card. To enforce authentication methods at the application proxy that require something the user has (e.g., smartphone, hardware token, smart card) and/or something the user is (e.g., biometric), the user must be enrolled in those authentication methods.

In an embodiment, the application proxy does not act as an identity provider. In such an embodiment, the application proxy redirects authentication requests to an identity provider that performs the authentication. For example, upon a user attempting to access an application protected by the application proxy, the authentication request is redirected to an identity provider for verification of the user's identity. The customer may have a policy defined with the identity provider for the identity verification, which may include an MFA requirement. As an example, the identity provider may be configured to require a user to provide their username and password plus successfully complete another authentication method (e.g., email based one-time password, etc.) to successfully verify the user's identity. Thus, to successfully verify the user's identity at the IdP, a user may be required to perform MFA depending on the configuration of the IdP. As another example, the identity provider may be configured to require a user to use passkey passwordless authentication. The authentication requirement at the identity provider may be the same or different from the authentication requirement at the application proxy. Thus, the authentication requirement at the application proxy is independent, or agnostic, to any authentication requirement at the identity provider. For clarity, an authentication requirement enforced by the identity provider is sometimes referred herein as an IdP authentication requirement, while an authentication requirement enforced by the application proxy is sometimes referred herein as an application proxy authentication requirement.

If the identity verification is successful, the IdP redirects the user agent back to the application proxy with an authentication response that establishes that the user has successfully verified their identity to the identity provider. The authentication response may include information that specifies the one or more authentication methods used during the identity verification. As an example, the authentication response includes an ID token, or a code to retrieve an ID token from the IdP, that contains the claims about the authentication event and may include a claim about the authentication methods used (e.g., an authentication methods reference (amr) claim). Example amr values are defined in Request For Comments (RFC) 8176, titled "Authentication Method Reference Values, June 2017. The authentication methods claim (e.g., the amr claim) identifies the authentication method(s) used in the identity verification. Example amr values include: "face" indicates biometric authentication using facial recognition was used, "bio" indicates biometric authentication was used, "fpt" indicates biometric authentication using a fingerprint was used, "hwk" indicates a hardware-secured key, "mfa" indicates multiple factor authentication was performed, "otp" indicates a one-time password was used, "pin" indicates a personal identification number (PIN) was used, "pwd" indicates a password was used, "rba" indicates that risk-based authentication was used, "sc" indicates that a smart card was used, "sms" indicates that a text message authentication was used, "swk" indicates that proof-of-possession of a software-secured key was used, "tel" indicates that a telephone call was used, "user" indicates a user presence test was used, "phr" indicates that a phishing-resistant method was used (e.g., passkey), and "fido" or "fido2" indicates that a method using WebAuthn was used. There can be multiple authentication methods listed in the claim. For example, a claim that lists fido2, face, and mfa indicates that a FIDO2 authenticator was used with facial recognition as part of a multifactor authentication process. The specific way the authentication methods are defined in the amr claim can be different for different identity providers.

The application proxy compares the information that specifies the one or more authentication methods used during the identity verification (in the authentication response) to the authentication method(s) that are acceptable for satisfying the application proxy authentication requirement for access to the application being requested. As an example, assume that the application proxy authentication requirement for accessing the application requires a hardware-secured key authentication method. The application proxy can look in the amr field in the authentication response for an indication that a hardware-secured key authentication method (e.g., hwk) was used during the identity verification at the identity provider. If the authentication method(s) for the application proxy authentication requirement corresponds to the authentication method(s) used during the identity verification (as indicated in the authentication response), the application proxy does not cause the user to be prompted to perform the authentication method(s) for the application proxy authentication requirement. Instead, the application proxy relies on the authentication method(s) performed at the identity provider. If the authentication method(s) for the application proxy authentication requirement does not correspond to the authentication method(s) used during the identity verification (as indicated in the authentication response), or if the authentication response does not specify the authentication method(s) used, the application proxy causes the user to be prompted to perform the authentication method(s) configured for the application proxy authentication requirement.

A policy that specifies an application proxy authentication requirement is independent of any authentication method policy enforced by the identity provider(s). This allows for authentication method requirements to be configured on a per-application and/or per policy basis. Because the authentication policies are enforced at the application proxy independently of the identity provider, a customer can have different authentication method policies applied to different applications even if using the same identity provider. Further, it is possible to apply an authentication method policy at the application proxy without any multifactor authentication performed by the IdP (if supported by the IdP). Also, this allows for step-up authentication to be performed. For instance, depending on the authentication method policy configuration, the application proxy can trigger an additional authentication prompt (requiring the same, or different (e.g., stronger) authentication method) when it detects the user is attempting to perform a high-risk action, access sensitive data, is in a restricted location, etc.

FIG. 1 illustrates an exemplary system for IdP agnostic authentication enforcement according to an embodiment. The system includes a distributed cloud computing network 120 that provides a service that operates an application proxy 110. The distributed cloud computing network 120 also includes a configuration server 140 that can be used to configure the application proxy service. The application proxy 110 executes on one or more intermediary servers (not shown in FIG. 1) that are part of the distributed cloud computing network 120. The distributed cloud computing network 120 can include multiple data centers that each include multiple servers, respectively. Each of these servers and/or data centers may execute an instance of the application proxy 110.

The application proxy 110, which can be part of a zero-trust network access service, enforces access control to application(s). The application proxy 110 includes the application access enforcer 111 that enforces access policies to the applications such as the application 130. For those access policies that include an application proxy authentication requirement, the application access enforcer 111 uses the authentication service 112 to perform the authentication.

The authentication service 112 is shown as being part of the application proxy 110. In an embodiment, the authentication service 112 is on a different server from the application proxy 110.

The configuration server 140 allows customers to configure one or more identity providers, one or more applications, and one or access policies for the applications. An access policy can specify one or more authentication methods acceptable for satisfying an authentication requirement for accessing an application, which is enforced by the application proxy 110.

Client devices, such as the client device 105, access resources protected or serviced by the application proxy 110. The client device 105 is a computing device that transmits and receives network traffic. Such a computing device can be a laptop, desktop, smartphone, mobile phone, tablet, gaming system, set top box, internet-of-things (IoT) device, wearable device, or other network device. The client device 105 executes a user agent 107 that initiates requests for network resources. Example user agents include browsers, bots, command-line tools, mobile applications, and scripts. The client device 105 may also include an access agent 109 that securely connects to the distributed cloud computing network 120. For instance, the access agent 109 may establish a tunnel connection (e.g., a VPN connection) with a server of the distributed cloud computing network 120, intercept all outgoing internet traffic or a defined subset of traffic, and transmit the traffic over the tunnel to the server. The tunnel connection may be a WireGuard point-to-point tunnel or another secure tunnel such as TLS, IPsec, HTTP/2, or those implemented with MASQUE. The access agent 109 may be configured to transmit identity information of the user of the client device (e.g., an email address, a unique device identifier, a unique identifier tied to the agent, an organization identifier to which the user belongs, etc.) to the distributed cloud computing network 120.

The application proxy 110 may receive traffic in different ways. As an example, the client device 105 may include the access agent 109 that intercepts outgoing internet traffic, or a defined subset of traffic, and transmits the traffic over a tunnel to the distributed cloud computing network 120. As another example, the client device 105 may transmit traffic to the distributed cloud computing network 120 due to a proxy auto-configuration (PAC) file that specifies that traffic is to be transmitted to the distributed cloud computing network 120. As another example, the client device 105 may transmit traffic to the distributed cloud computing network 120 due to the client device connecting to a proxy website that connects to a remote browser in the distributed cloud computing network 120. As another example, the client device 105 can transmit traffic to the distributed cloud computing network 120 due to selection of a link that resolves to a remote browser in the distributed cloud computing network 120. As another example, all traffic to and from the client device 105 may traverse a router that has a GRE tunnel or IPsec tunnel to the distributed cloud computing network 120. As another example, all traffic to and from the client device 105 may traverse a server or virtual machine that includes an agent that connects to the distributed cloud computing network 120. As another example, the application proxy 110 may receive traffic for the application 130 because a domain of the application 130 resolves to an IP address of the distributed cloud computing network 120 instead of an IP address of the application 130 (e.g., an A record pointing the hostname of the application 130 to an IP address of the distributed cloud computing network 120, a CNAME record pointing the hostname of the application 130 to a hostname belonging to the distributed cloud computing network 120 that resolves to an IP address of the distributed cloud computing network 120).

In an embodiment, the application proxy 110 does not act as an identity provider. In such an embodiment, the application proxy 110 redirects authentication requests to an identity provider that performs verification of the user's identity such as against a user directory. The identity provider(s) 150 may each have their own requirements or rules that must be followed to prove identity. For instance, a first identity provider may be configured to require MFA, and a second identity provider may not.

The configuration server 140 allows a customer to configure identity provider(s) 150 for verifying users' identity against a user directory, stored in the identity provider configuration 142. The application proxy 110 may support identity providers that support SAML 2.0 or OpenID Connect (OIDC). The customer may also have to configure, at the identity provider, the application proxy service. For example, to support a SAML 2.0 identity provider, at the identity provider itself, a customer can configure parameters that the identity provider uses to establish an integration with the application proxy 110. This may include setting the entity ID or issuer URL and a single sign-on URL provided by the distributed cloud computing network 120. At the configuration server 140, the customer enters the single sign-on URL, the IdP entity ID or issuer URL, and signing certificate, each being provided by the identity provider. As an example to support an OIDC identity provider, at the identity provider itself, a customer can configure parameters that the identity provider uses to establish an integration with the application proxy 110, which may include setting an authorized redirect URI provided by the application proxy service. At the configuration server 140, the customer can add a client ID, client secret, authorization URL, token URL, and a certificate URL provided by the identity provider. The identity provider itself may allow, or require, multifactor authentication to enforce an IdP authentication requirement.

The configuration server 140 allows a customer to configure an application to be protected by the application proxy 110, stored in the application configuration 144. An application refers to one or more resources and/or one or more services to protect such as a web application (e.g., SaaS application, self-hosted public application) or a non-HTTP application (e.g., an application such as a server, database, or remote desktop; self-hosted private application). An example of an application is a self-hosted application, which is hosted in the infrastructure of the customer, another cloud computing network, or within the distributed cloud computing network. As an example for configuring a self-hosted application, the customer can provide a name for the application, a session duration value that specifies how often a user's application token should expire (e.g., if the traffic is not associated with a valid token, the user will be prompted to reauthenticate with an identity provider), a hostname (which can be a public hostname or a private hostname), a path, a port, an IP address (which can be a publicly routable IP address or a private IP address or private CIDR range), and/or a set of one or more identity providers enabled for the application. It is possible to have different applications with different paths at the same hostname. For instance, a first application may be at app.example.com/1 and a second application may be at app.example.com/2.

The customer can also configure one or more access policies that apply to a configured application that define criteria that the user and/or device must meet to access the application, stored as the access policy configuration 146. Such a policy can be applied to user(s) associated with the customer (e.g., employees, contractors, organizational members, guest users, service accounts) that is managing access to the application. Each policy includes one or more rules to be evaluated. The rule(s) may include an application proxy authentication requirement. The application proxy authentication requirement may specify the authentication method(s) that are acceptable for satisfying the authentication requirement. For example, a policy may indicate whether MFA is enforced for the application at the application proxy 110, the type of authentication method(s) that are acceptable for satisfying the authentication requirement, whether a phishing-resistant authentication method is required (e.g., a passkey password authentication method), and the type of phishing-resistant authentication method that is acceptable for satisfying the authentication requirement. There may be multiple authentication methods that are acceptable for satisfying the application proxy authentication requirement. The policy can also include specific settings depending on the type of authentication method configured.

Example authentication methods that can be enforced at the application proxy include: one-time password (OTP) sent via text message, voice call OTP, email-based OTP, authenticator application time-based OTP (TOTP), push notification, hardware token OTP, security key (e.g., using WebAuthn), biometric authentication (e.g., using WebAuthn), and smart card. In a TOTP authentication method, the configuration may specify the authenticator applications that are allowed, or disallowed, to be used. In a WebAuthn based authentication method (e.g., security key), the configuration may specify the Authenticator Attestation Global Unique Identifier (AAGUI) that are allowed, or disallowed, to be used. The configuration can also specify the duration of the authentication session (e.g., minutes, hours, day). The configuration can also apply condition(s) such as a behavioral risk score, location, client device type, and/or user agent type. For example, if the user has a behavioral risk score over a threshold, the authentication method defined in the policy may be required to be performed. As another example, if the sign-in request is received from a certain location, the authentication method defined in the policy may be required to be performed.

The service allows users to enroll in a configured authentication method. For example, the user may have an account with the service. The account settings, provided by the application proxy 110 or another server or service of the distributed cloud computing network 120, may allow the user to add one or more authentication methods that can be used when accessing an application (e.g., OTP sent via text message, voice call OTP, email-based OTP, authenticator application time-based OTP (TOTP), push notification, hardware token OTP, security key (e.g., using WebAuthn), biometric authentication (e.g., using WebAuthn), and smart card). In an embodiment, a link to the enrollment page can be generated for sending to the users. When clicked, the user will be directed to the enrollment page for enrolling in the configured authentication methods.

The enrollment process differs depending on the authentication method. For example, for an email-based OTP, the user selects to enroll in an email-based authentication method and submits an email address (if not already provided) on the enrollment page for receiving the OTP code. The authentication service 112 generates an OTP and causes it to be sent in an email to the email address. The user retrieves the OTP from the email and submits it using the enrollment page. The authentication service 112 compares the submitted value against the generated OTP, enrolling the email address if the values match.

As another example, for an authenticator application TOTP, the user selects to enroll the authenticator application TOTP authentication method. The authentication service 112 generates a QR code (encoding a secret key) and/or the secret key, and the secret key is stored. The QR code and/or secret key is displayed on the enrollment page. The secret key is scanned or entered by the user in an authenticator app. The authenticator app generates a TOTP that is submitted by the user through the enrollment page. The authentication service 112 verifies the submitted TOTP by calculating the TOTP using the stored secret key and comparing the values, enrolling the authenticator application if the values match.

As another example, for a security key (e.g., using WebAuthn) authentication method, the user selects to enroll a security key authentication method on the enrollment page. The user inserts the security key in their device or prepares to interact wirelessly with the device (e.g., over NFC). The authentication service 112 prompts registration via the browser, prompting the user to interact with the security key (e.g., a physical interaction such as a touch of the key), and the security key generates a public-private key pair and submits the public key to the authentication service 112 and potentially with other data such as a unique identifier, metadata about the security key (e.g., manufacturer), and the challenge that is signed to prove authenticity. The authentication service 112 receives and may validate this information and stores the public key and potentially other information (e.g., the metadata and unique identifier), enrolling the security key.

As another example, for a biometric authentication method (e.g., using WebAuthn), the user selects to enroll a biometric authentication method on the enrollment page. The authentication service 112 prompts registration via the browser, prompting the user to register a biometric (e.g., fingerprint, face scan, PIN). The user performs the biometric action (e.g., scans their fingerprint or face) (or potentially enters a PIN if biometrics are not available). The client device authenticator generates a public-private key pair and submits the public key to the authentication service 112 and potentially with other data such as a unique identifier, metadata about the authenticator (e.g., TPM or secure enclave information), and the challenge that is signed to prove authenticity. The authentication service 112 receives and may validate this information and stores the public key and potentially other information (e.g., the metadata and unique identifier), enrolling the biometric authentication method.

As another example, for passkey passwordless authentication, the user selects to enroll a passkey on the enrollment page. The authentication service 112 creates a challenge that is sent to the client device via the browser. The browser prompts the user to create a passkey, which is typically provided by the operating system of the client device. The user typically provides a biometric (e.g., face scan, fingerprint) or PIN depending on the settings of the client device. The client device authenticator generates a public-private key pair and submits the public key to the authentication service 112 and potentially with other data such as a unique identifier, metadata about the authenticator, and the challenge that is signed to prove authenticity. The authentication service 112 receives and may validate this information and stores the public key and potentially other information (e.g., the metadata and unique identifier), enrolling the passkey passwordless authentication method.

As another example, in a text based authentication method, the user selects to enroll a text based authentication method on an enrollment page and enters a phone number to receive a text message. The authentication service 112 generates an OTP and causes it to be sent in a text message to the phone number. The user receives the text message and submits the OTP to the enrollment page. The authentication service 112 compares the submitted value against the generated OTP, enrolling the number if the values match.

The user may enroll in authentication method(s) prior to attempting to authenticate to an application. In an embodiment, inline enrollment is also supported by the authentication service 112. In an inline enrollment, if a user is not enrolled in a required authentication method for an application, the authentication service 112 may prompt the user to enroll the required authentication method.

In the example of FIG. 1, the application 130 has been configured by a customer of the distributed cloud computing network 120. In addition, one or more identity providers 150 have been configured by the customer. Also, one or more access policies for accessing the application 130 have been configured by the customer, including one or more authentication methods that are acceptable for satisfying an application proxy authentication method requirement to be enforced at the application proxy 110.

Traffic is received at the distributed cloud computing network 120 from client devices for the application 130. The traffic may be HTTP traffic or non-HTTP traffic. The HTTP traffic may be encrypted (e.g., HTTPS). For example, the application proxy 110 receives a request from the user agent 107 of the client device 105 for access to the application 130. As described earlier, the traffic from a client device can be received at the distributed cloud computing network 120 in different ways.

The application proxy 110 receives requests from user agents for access to applications protected by the application proxy 110. For example, the application proxy 110 can receive a request from the user agent 107 to access the application 130. A request may include a set of one or more tokens that can be used to verify that the user has satisfied the authentication requirements including satisfying the identity provider authentication requirement and any application proxy authentication requirement. The token(s) may be sent in a cookie or in a request header.

In an embodiment, at least two tokens are used to verify that the user has satisfied the authentication requirements. In such an embodiment, an identity provider authentication token, which can be a self-contained token or a reference token, can be used to verify that the user has successfully authenticated according to the identity provider authentication requirement; and an application proxy authentication token, which can be a self-contained token or a reference token, can be used to verify that the user has successfully authenticated according to the application proxy authentication requirement. As an example, the application proxy authentication token can be a reference token that uniquely identifies the user agent 107 or a unique identifier tied to the access agent 109, where the identifier can be used to determine whether the application proxy authentication requirement has been satisfied. In another embodiment, a single token is used to verify whether the user has satisfied the authentication requirements including the identity provider authentication requirement and any application proxy authentication requirement.

If the request does not include the set of one or more tokens, and an applicable policy includes an application proxy authentication requirement, the authentication service 112 generates an authentication request for an identity provider 150 and redirects the user agent 107 to transmit the authentication request to the identity provider 150.

The user may verify their identity with the identity provider by performing an authentication according to the IdP authentication requirement. If the user successfully verifies their identity, the authentication service 112 receives an authentication response that was generated by the identity provider 150. The authentication response may include information that specifies the authentication method(s) used in the identity verification (e.g., in the amr claim). The authentication service 112 compares the information that specifies the one or more authentication methods used during the identity verification (in the authentication response) to the authentication method(s) that are acceptable for satisfying the application proxy authentication requirement for access to the application being requested. If there is a match, the authentication service 112 does not cause the user to be prompted to perform the authentication method(s) for the application proxy authentication requirement.

Assuming that any other applicable access rule(s) have been passed, the access enforcer 111 sets the one or more tokens for the user agent 107. The set of tokens indicates that the user has authenticated and is authorized, at least at the time of this request, to access the application 130, including satisfying the application proxy authentication requirement. The application proxy 110 communicates the set of tokens to the user agent 107 that can be used to verify the successful authentication. The application proxy redirects the user agent 107 to resubmit the request for accessing the application 130, which will include the set of tokens.

If there is not a match, the authentication service 112 causes the user to be prompted to perform the authentication method(s) configured for the application proxy authentication requirement. The authentication service 112 verifies the authentication response received from the user. If it is valid, then the authentication service 112 sets the application proxy authentication requirement as passed. Assuming all other access rules, if any, are passed, the set of tokens is set for the user agent 107. The user agent 107 is redirected to resubmit the request for accessing the application 130 with the set of tokens. If the authentication response is not valid, then the user agent 107 is blocked from accessing the application 130.

Figure 2:
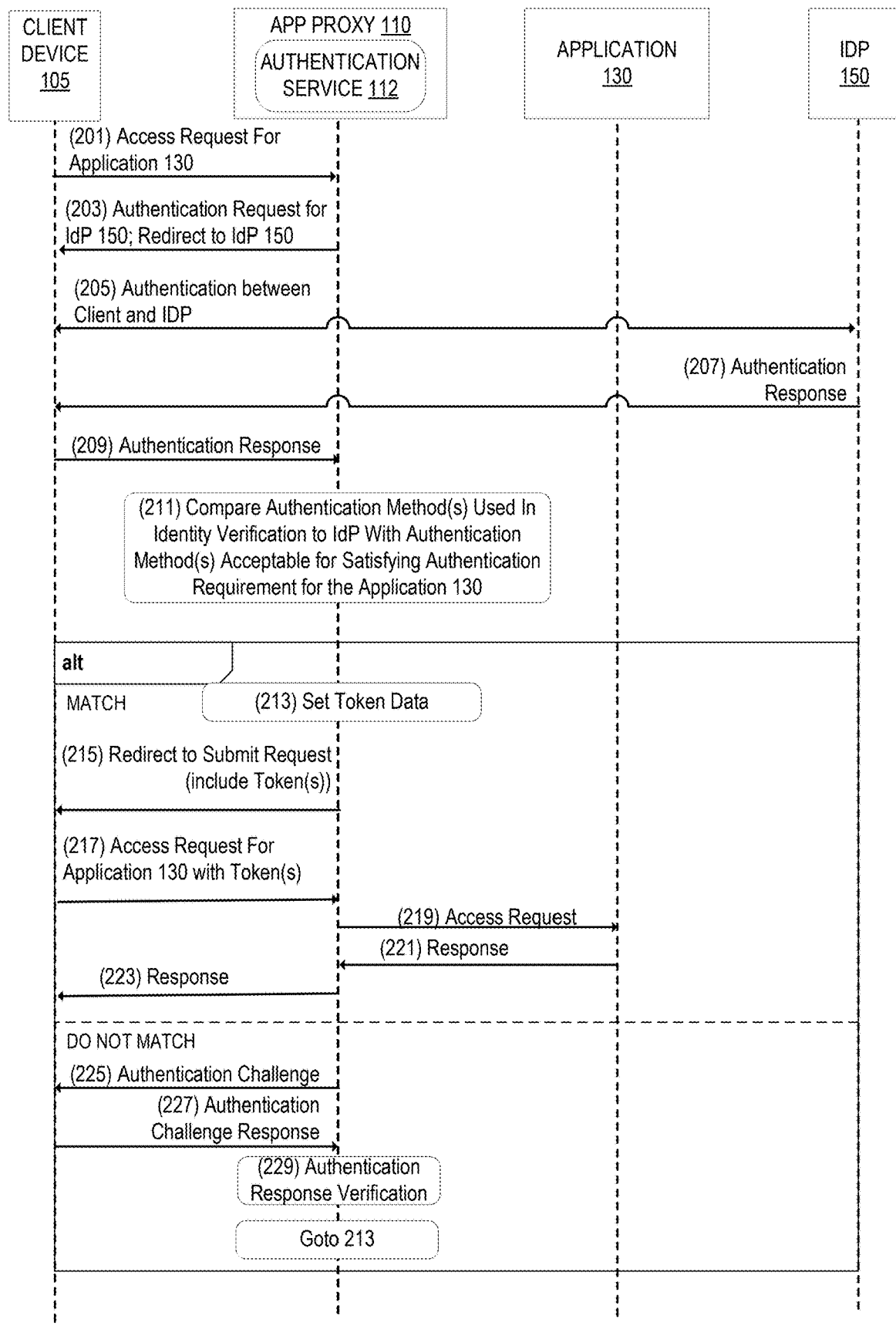
FIG. 2 is a sequence diagram that illustrates exemplary operations for IdP-agnostic authentication enforcement according to an embodiment.

FIG. 2 is a sequence diagram that illustrates exemplary operations for IdP-agnostic authentication enforcement according to an embodiment. In the embodiment of FIG. 2, traffic from the user agent 107 of the client device 105 is received at the application proxy 110 for the application 130. The application proxy 110 can receive the traffic in different ways. As an example, the application proxy 110 may receive traffic for the application 130 because a domain of the application 130 resolves to an IP address of the distributed cloud computing network 120 instead of an IP address of the application 130 (e.g., an A record pointing the hostname of the application 130 to an IP address of the distributed cloud computing network 120, a CNAME record pointing the hostname of the application 130 to a hostname belonging to the distributed cloud computing network 120 that resolves to an IP address of the distributed cloud computing network 120). As another example, the client device 105 may be executing an access agent 109 that securely connects to the application proxy 110. The access agent 109 may establish a tunnel connection (e.g., a VPN connection) with a server that is executing the application proxy 110 and intercept all outgoing internet traffic or a defined subset of traffic and transmit the traffic over the tunnel to the server. The tunnel connection may be a WireGuard point-to-point tunnel or another secure tunnel such as TLS, IPsec, HTTP/2, or those implemented with MASQUE. The access agent 109 may connect with the application proxy 110 regardless of the internet connection of the client device 105. For instance, the client device 105 may be on a public Wi-Fi network or other network not owned or controlled by the customer. The access agent 109 may be configured to transmit identity information of the user of the client device (e.g., an email address, a unique device identifier, a unique identifier tied to the agent, an organization identifier to which the user belongs, etc.) to the application proxy 110. As another example, the client device 105 may be on a private network belonging to the customer (e.g., an office network) where traffic is received at the application proxy 110. For instance, a piece of network equipment (e.g., a router) of a branch office may be configured with a GRE tunnel to the application proxy 110. The application proxy 110 may have access to the identity of the organization (e.g., the customer) associated with the tunnel.

At operation 201, the application proxy 110 receives a request from the client device 105 for access to an application 130. As an example, the request is for https://app.example.com. The application 130 has been configured to be protected by the application proxy 110. This request is not associated with a valid token that indicates the user has met the identity provider authentication requirement and any application proxy authentication requirement.

All traffic to the application 130 may be received and evaluated by the application proxy 110 before being transmitted to the application 130. Traffic for the application 130 can be received at the application proxy 110 in different ways. For example, in one way, the traffic is received at the application proxy 110 because a domain of the application 130 resolves to an IP address of the distributed cloud computing network 120 instead of an IP address of the application 130 (e.g., an A record pointing the hostname of the application 130 to an IP address of the distributed cloud computing network 120, a CNAME record pointing the hostname of the application 130 to a hostname belonging to the distributed cloud computing network 120 that resolves to an IP address of the distributed cloud computing network 120). As another example, the traffic can be received at the distributed cloud computing network 120 because the distributed cloud computing network 120 advertises the IP address of the application 130. As another example, the client device 105 may have an access agent 109 that intercepts all outgoing internet traffic or a defined subset of traffic and transmit the traffic over a tunnel to the distributed cloud computing network 120. As another example, all traffic from and to the client device 105 may traverse a router that has a GRE tunnel or IPsec tunnel to the distributed cloud computing network 120 such that all traffic from and to the client device 105 goes through the distributed cloud computing network 120. As another example, the client device 105 may transmit traffic to the distributed cloud computing network 120 due to a proxy auto-configuration (PAC) file that specifies that traffic is to be transmitted to the distributed cloud computing network 120.

The application 130 is associated with one or more access policies. The application access enforcer 111 of the application proxy 110 enforces the one or more access policies. The rule(s) in the access policy(ies) can be based on attributes associated with the user, the request, and/or the application. These rules can be identity-based or non-identity based. The identity-based rule(s) are based on the identity of the user (e.g., provided by the IdP 150) such as a username, email address, etc., and may, for example, determine whether the identified user has access rights to the application 130. The non-identity rule(s) are not based on the identity of the user and may, for example, specify rules for accessing or not accessing the application 130. Example non-identity rules include rules based on location (e.g., geographic region such as the country of origin), device posture, time of request, type of request, IP address, identity provider MFA status, identity provider MFA type, type of client device, type of user agent, whether the request is associated with an access agent on the client device, whether MFA is enforced at the application proxy 110, the type of authentication method(s) that are acceptable for satisfying the application proxy authentication requirement, whether a phishing-resistant authentication method is required (e.g., a passkey password authentication method) for the application proxy authentication requirement, the type of phishing-resistant authentication method that is acceptable for satisfying the application proxy authentication requirement, and/or other layer 3, layer 4, and/or layer 7 policies. The authentication proxy authentication requirement may be triggered based on other conditions. As an example, an access policy may include an authentication method requirement based on a behavioral risk score (e.g., if over a risk score threshold, trigger a certain authentication method). As another example, an access policy may include an authentication requirement based on location of the request (e.g., if the request is received from a certain location, trigger a certain authentication method).

In this example, an access policy that is associated with the application 130 includes a rule that defines an application proxy authentication requirement that is enforced by the application proxy 110. This application proxy authentication requirement is independent of any IdP authentication requirement of an identity provider. The application proxy authentication requirement may specify one or more authentication methods that are acceptable for satisfying the application proxy authentication requirement enforced by the application proxy 110 to access the application 130. Also, in this example, the application proxy 110 is not an identity provider. Instead, the client device 105 is redirected to an identity provider for performing verification of the user's identity against a user directory. The identity provider(s) that are allowed to be used for the application 130 are configured. If there are multiple such identity providers configured, the identity providers are presented to the user for selection. For example, the authentication service 112 transmits an identity provider selection page to the client device 105 that allows the user to select one of the available identity providers. The application proxy 110 then redirects the client device to the selected identity provider for identity verification. If there is a single identity provider configured for the application 130, the application proxy 110 redirects the client device to that identity provider for identity verification. Thus, at operation 203, the authentication service 112 generates an authentication request for the identity provider 150 and redirects the client device 105 to transmit the authentication request to the identity provider 150. The authentication request may be a SAML AuthnRequest or an Authorization Request URL depending on the authentication protocol used by the identity provider 150.

The client device 105 receives this authentication request and transmits the authentication request to the identity provider 150. The client device 105 and the identity provider 150 perform an authentication according to the rules and requirements of the identity provider 150 at operation 205. For instance, the user of the client device 105 may provide credentials (e.g., username/password) and may be required to perform multifactor authentication.

Assuming that a successful authentication occurs (e.g., the user of the client device 105 successfully verifies their identity with the identity provider 150), the identity provider 150 generates and transmits an authentication response to the client device 105 at operation 207. The client device 105 transmits the authentication response to the authentication service 112 at operation 209. The authentication response message may be any type of protocol for communicating identity. For instance, the authentication response may be a SAML message, an OpenID connect (OIDC) message, or other protocol for sending identity. The authentication response establishes that a user has successfully verified their identity with the identity provider 150. The authentication response includes information that indicates claims about the authentication event and may include a claim that indicates the one or more authentication methods used during the identity verification. The possible authentication methods may include facial recognition, fingerprint, hardware-security key, MFA, OTP, password, risk-based authentication, smart card, text message, software-secured key, telephone, user presence test, phishing-resistant method, and FIDO/FIDO2. The authentication response may include an ID token with these claims or may include a code for the application proxy to retrieve the ID token from the identity provider 150.

In an embodiment, the authentication service 112 sets a token, which can be a self-contained token or a reference token, that can be used to verify that the user has successfully authenticated according to the identity provider authentication requirement. This token may be communicated to the user agent 107 in a cookie or in a response. The application proxy 110 may redirect the user agent 107 to resubmit the request and include the token. The application proxy 110 verifies the token and then moves to operation 211.

In an embodiment, the authentication service 112 checks whether the authentication method(s) used during the identity verification to the IdP correspond to the authentication method(s) that are acceptable satisfying the application proxy authentication requirement to the application 130 enforced by the application proxy 110. Thus, at operation 211, the authentication service 112 compares the authentication method(s) used during identity verification to the identity provider 150 (indicated in the authentication response) with the authentication method(s) that are acceptable for satisfying the application proxy authentication requirement to access the application 130. If there is a match, then operation 213 will be performed. If there is not a match, then operation 225 will be performed.

If the authentication method(s) used during the identity verification to the identity provider 150 match the authentication method(s) that are acceptable for satisfying the application proxy authentication requirement to access the application 130, the authentication service 112 does not cause the user to be prompted to again perform the authentication method(s) at the application proxy 110. This prevents the user from being prompted for the same authentication method within a short period of time.

Assuming that the other applicable access rule(s) are passed, at operation 213, the application access enforcer 111 sets token data that indicate that the user has successfully authenticated and is authorized, at least at time of this request, to access the application 130 including satisfying the application proxy authentication requirement for access to the application 130.

In an embodiment, at least two tokens are communicated to the user agent 107 that can be sent in future requests and used by the application proxy 110 to verify that the user is authenticated. For example, an identity provider authentication token and an application proxy authentication token can be sent to the user agent 107. The identity provider authentication token can be used to verify that the user has successfully authenticated according to the identity provider authentication requirement. The application proxy authentication token can be used to verify that the user has successfully authenticated according to the application proxy authentication requirement. These tokens can be self-contained tokens that includes all information necessary for the application proxy 110 to verify the token and statements about the entity (e.g., the user such as the user's identity and permission), or reference tokens that include an identifier that is used by the application proxy 110 to look up the information. In another embodiment, a single token can be used for verifying that the user has satisfied the identity provider authentication requirement and the application proxy authentication requirement. The token data includes an expiration date that may be the same, or smaller, than the session duration value configured for the application 130.

The application proxy 110 communicates the set of tokens to the client device 105. The tokens may be communicated in a cookie or in a response. The application proxy 110 redirects the client device 105 to submit the original request again with the set of tokens at operation 215. The redirect can be an HTTP 302 redirect response that includes the token(s) as cookie(s). The application proxy 110 receives the request from the client device 105 that includes the token(s) at operation 217. For instance, the request is for https://app.example.com and includes the token(s) in one or more cookies or one or more request headers. The application proxy 110 uses the token(s) to verify that the user has been authenticated, including satisfying the application proxy authentication requirement for access to the application 130. Verifying a token can include verifying the digital signature and checking that the token has not expired. If a token is a reference token, the application proxy 110 retrieves the data corresponding to the reference token prior to verification.

In a case where the client device 105 includes an access agent 109 that transmits a unique agent identifier with the request, that identifier can be associated with the application proxy authentication information and can be used to verify that the user has successfully authenticated according to the application proxy authentication requirement. This allows for cross-browser (e.g., cross-user agent) session management. For instance, if a user uses a first browser when satisfying the application proxy authentication requirement for accessing the application 130, the application proxy authentication information may be associated with the unique agent identifier. If a user then uses a second browser to access the application 130 and the access agent 109 transmits its unique agent identifier, the application proxy 110 can use the unique agent identifier to determine whether the application proxy authentication requirement has been satisfied.

Assuming that the token(s) are valid, the application proxy 110 continues to service the request. For example, the application proxy 110 transmits the request to the application 130 at operation 219. For instance, the request is for https://app.example.com. The application proxy 110 may include the token(s) in this request, which the application 130 can use for validation. The application proxy 110 receives a response from the application 130 at operation 221. The application proxy 110 transmits the response to the client device 105 at operation 223.

If the authentication method(s) used during the identity verification to the IdP 150 (as included in the authentication response) do not match the authentication method(s) that are acceptable for satisfying the application proxy authentication requirement to the application 130, operation 225 is performed. At operation 225, the authentication service 112 causes the user to be prompted to perform the authentication method(s) configured to meet the application proxy authentication requirement. The authentication method that is used can depend on the configuration of the application 130. If there are multiple authentication methods configured, each of which can satisfy the authentication requirement, the authentication service 112 can prompt the user to select one of the authentication methods to perform. The authentication service 112 then prompts the user to complete the selected authentication method. If there is a single authentication method configured, the authentication service 112 prompts the user to complete the authentication method.

For instance, the authentication service 112 transmits an authentication challenge to the client device 105 at operation 225. The client device 105 transmits an authentication challenge response to the authentication service 112 at operation 227. The authentication service 112 performs a verification of the authentication response at operation 229. Assuming that the authentication was successfully verified, operation 213 is performed.

The performance of the authentication method is different depending on the method. For example, if the authentication method is an email-based OTP, the authentication service 112 may cause an email to be sent that includes an OTP and provide a page for the user to submit the OTP. The authentication service 112 verifies that the OTP submitted is the one sent over the email. As another example, if the authentication method is an authenticator application TOTP, the authentication service 112 causes a page to be sent to the client device for the user to submit a TOTP. The authentication service 112 generates a TOTP using the stored secret key and compares the generated TOTP with the submitted TOTP. As another example, if the authentication method is a security key (e.g., using WebAuthn) method, the authentication service 112 generates an authentication challenge and prompts the prompts the user to interact with the security key (e.g., a physical interaction such as a tough of the key) to cause the security key to sign the authentication challenge. The authentication service 112 receives the signed authentication challenge and verifies it (e.g., verifies the signature and the challenge). As another example, if the authentication method is a biometric authentication method (e.g., using WebAuthn), the authentication service 112 generates an authentication challenge and prompts the user to provide a biometric (e.g., a fingerprint, face scan, PIN) to cause the client device authenticator to sign the authentication challenge. The authentication service 112 receives the signed authentication challenge and verifies it (e.g., verifies the signature and the challenge). As another example, if the authentication method is a passkey password authentication, the authentication service 112 generates an authentication challenge and prompts the user to submit a passkey to cause the client device authenticator to sign the authentication challenge and transmit it to the authentication service 112. The authentication service 112 receives the signed authentication challenge and verifies it (e.g., verifies the signature and the challenge).

Figure 3:
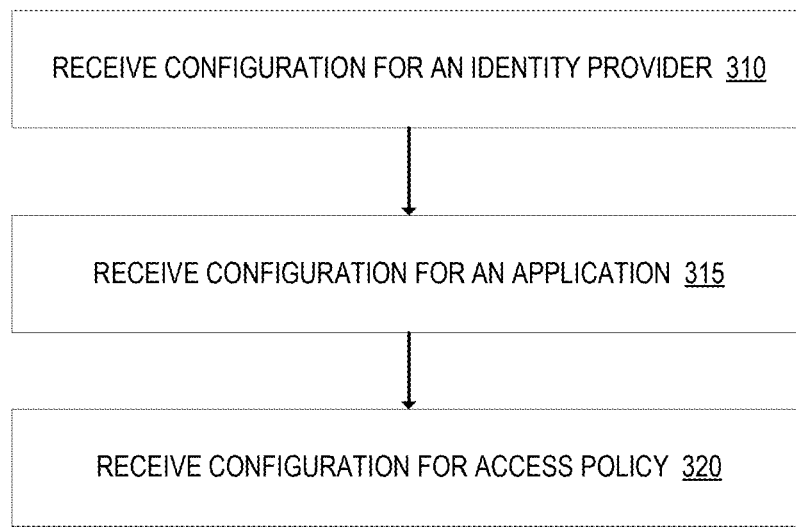
FIG. 3 is a flow diagram that illustrates exemplary operations for configuring IdP-agnostic authentication enforcement according to an embodiment.

FIG. 3 is a flow diagram that illustrates exemplary operations for configuring IdP-agnostic authentication enforcement according to an embodiment. FIG. 3 is described with reference to the exemplary embodiment of FIG. 1. However, the operations of FIG. 3 can be performed by different embodiments from FIG. 1, and the exemplary embodiment of FIG. 1 can perform different operations from FIG. 3.

At operation 310, the configuration server 140 receives configuration from a customer that defines an identity provider for use by the application proxy 110. The customer may define multiple identity providers. The configuration for the identity provider(s) is stored in the identity provider configuration 142. The application proxy 110 may support identity providers that support SAML 2.0 or OpenID Connect (OIDC). The customer may also have to configure, at the identity provider, the application proxy service. For example, to support a SAML 2.0 identity provider, at the identity provider itself, a customer can configure parameters that the identity provider uses to establish an integration with the application proxy 110. This may include setting the entity ID or issuer URL and a single sign-on URL provided by the application proxy service. At the configuration server 140, the customer enters the single sign-on URL, the IdP entity ID or issuer URL, and signing certificate, each being provided by the identity provider. As an example to support an OIDC identity provider, at the identity provider itself, a customer can configure parameters that the identity provider uses to establish an integration with the application proxy 110, which may include setting an authorized redirect URI provided by the application proxy service. At the configuration server 140, the customer can add a client ID, client secret, authorization URL, token URL, and a certificate URL provided by the identity provider. The identity provider itself may allow, or require, an MFA policy to enforce an IdP authentication requirement.

At operation 315, the configuration server 140 receives configuration from a customer that defines an application to be protected by the application proxy 110, such as the application 130. The application configuration is stored in the application configuration 144. The configuration for an application depends on the type of application being protected (e.g., web application (e.g., SaaS application, self-hosted public application) or non-HTTP application). As an example for configuring a self-hosted application, the customer can provide a name for the application, a session duration value that specifies how often a user's application token should expire (e.g., if the traffic is not associated with a valid token, the user will be prompted to reauthenticate with an identity provider), a hostname (which can be a public hostname or a private hostname), a path, a port, an IP address (which can be a publicly routable IP address or a private IP address or private CIDR range), and/or a set of one or more identity providers enabled for the application. It is possible to have different applications with different paths at the same hostname. For instance, a first application may be at app.example.com/1 and a second application may be at app.example.com/2.

At operation 320, the configuration server 140 receives configuration from a customer that defines one or more access policies that apply to a configured application that defines criteria that the user and/or device must meet to access the application. Each policy includes one or more rules to be evaluated. The access policy configuration is stored in the access policy configuration 146. The rule(s) may include an application proxy authentication requirement. The application proxy authentication requirement may include whether MFA is enforced for the application at the application proxy 110, the type of authentication method(s) that are acceptable for satisfying the authentication requirement (there may be more than one authentication method accepted), whether a phishing-resistant authentication method is required (e.g., a passkey password authentication method), and the type of phishing-resistant authentication method that is acceptable for satisfying the authentication requirement. There may be multiple authentication methods that are acceptable for satisfying the application proxy authentication requirement. The policy can also include specific settings depending on the type of authentication method configured. Example authentication methods that could be used include one-time password (OTP) sent via text message, voice call OTP, email-based OTP, authenticator application time-based OTP (TOTP), push notification, hardware token OTP, security key (e.g., using WebAuthn), biometric authentication (e.g., using WebAuthn), and smart card. In a TOTP authentication method, the configuration may specify the authenticator applications that are allowed, or disallowed, to be used. In a WebAuthn based authentication method (e.g., security key), the configuration may specify the Authenticator Attestation Global Unique Identifier (AAGUI) that are allowed, or disallowed, to be used. The configuration can also specify the duration of the authentication session (e.g., minutes, hours, day). The configuration for the application proxy authentication requirement can define condition(s) for triggering the application proxy authentication requirement such as a behavioral risk score, location, client device type, and/or user agent type. For example, if the user has a behavioral risk score over a threshold, the authentication method defined in the policy may be required to be performed. As another example, if the sign-in request is received from a certain location, the authentication method defined in the policy may be required to be performed. The access policy can also include one or more other rules that are identity-based or non-identity based. Further, there may be multiple access policies that are applicable for the application.

Figure 4:
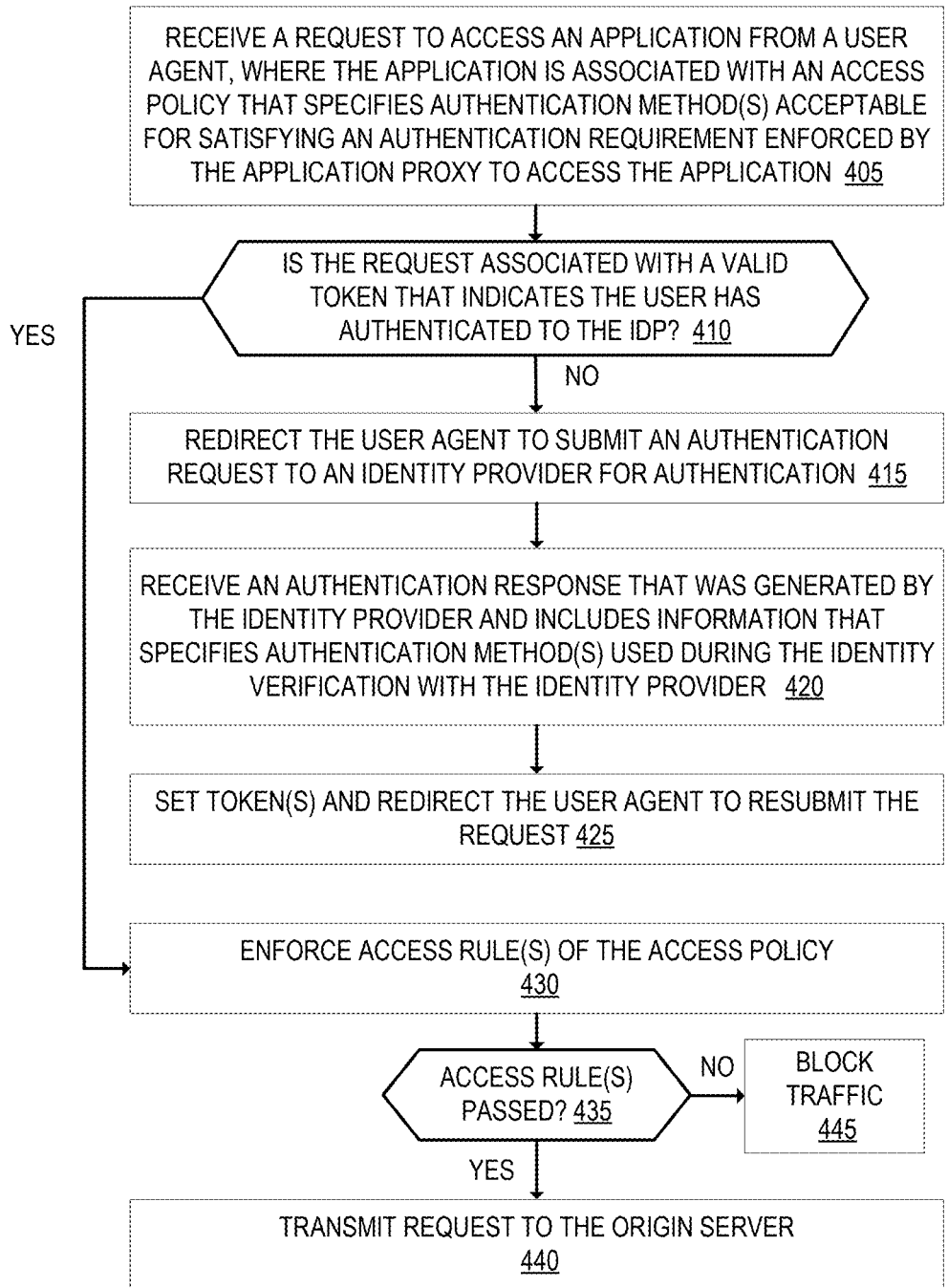
FIG. 4 is a flow diagram that illustrates exemplary operations for IdP-agnostic authentication enforcement according to an embodiment.

FIG. 4 is a flow diagram that illustrates exemplary operations for IdP-agnostic authentication enforcement according to an embodiment. FIG. 4 is described with reference to the exemplary embodiment of FIG. 1. However, the operations of FIG. 4 can be performed by a different embodiment from FIG. 1, and the exemplary embodiment of FIG. 1 can perform different operations from FIG. 4.

At operation 405, the application proxy 110 receives a request to access the application 130 from a user agent 107 of the client device 105. The application 130 is associated with an access policy that includes a rule that specifies a set of one or more authentication methods acceptable for satisfying an authentication requirement enforced by the application proxy 110 for accessing the application 130. The access policy may have one or more additional rules for accessing the application 130, and/or there may be additional access policy(ies) that are associated with the application 130.

Next, at operation 410, the application proxy 110 determines whether the request is associated with a token that indicates that the user has authenticated to the identity provider, satisfying the identity provider authentication requirement. The application proxy 110 looks for a token in a cookie or a request header. If found, the application proxy 110 performs a verification on the signature of the associated token and determines whether it has expired. Prior to verifying the token, if the token is a reference token, the application proxy 110 retrieves the associated data using the identifier included in the reference token.

A valid identity provider authentication token indicates that the user has successfully authenticated to the identity provider. The identity provider authentication token may include identity information about the user such as an email address of the authenticated user as verified by the identity provider. If the request is not associated with a valid token that indicates that the user has successfully authenticated to the identity provider, it typically indicates that the user is either not yet authenticated or their session has expired. In that case, operation 415 is performed.

In the example of FIG. 4, the identity proxy is not an identity provider. Instead, the user agent 107 is redirected to submit an authentication request to an identity provider for identity verification. Thus, at operation 415, the application proxy 110 redirects the user agent 107 to submit an authentication request to an identity provider 150 for identity verification. The identity provider(s) that are allowed to be used for the application 130 are configured. If there are multiple such identity providers configured, the identity providers are presented to the user for selection. For example, the application proxy 110 transmits an identity provider selection page to the user agent 107 that allows the user to select one of the available identity providers. The application proxy 110 then generates an authentication request and redirects the user agent 107 to submit the authentication request to the selected identity provider for identity verification. If there is a single identity provider configured for the application 130, the application proxy 110 generates an authentication request and redirects the user agent 107 to submit the authentication request to that identity provider for identity verification. The authentication request may be a SAML AuthnRequest or an Authorization Request URL depending on the authentication protocol used by the identity provider 150.

The user agent 107 will receive the authentication request and transmit it to the identity provider 150. An authentication process to verify the user's identity against a user directory is performed according to the rules and requirements of the identity provider. For instance, the user of the user agent 107 may provide credentials (e.g., username/password) and may be required to perform MFA. Assuming that a successful authentication occurs (e.g., the user of the user agent 107 successfully verifies their identity to the identity provider 150), the identity provider 150 generates and transmits an authentication response to the user agent 107 for transmission to the application proxy 110.

At operation 420, the application proxy 110 receives an authentication response that was generated by the identity provider 150. This authentication response establishes that a user has successfully verified their identity with the identity provider 150. The authentication response includes information that indicates claims about the authentication event and may include a claim that indicates the one or more authentication methods that were used during the authentication. The possible authentication methods may include, for example: facial recognition, fingerprint, hardware-security key, MFA, OTP, password, risk-based authentication, smart card, text message, software-secured key, telephone, user presence test, phishing-resistant method, and FIDO/FIDO2. The authentication response may include an ID token with these claims or may include a code for the application proxy 110 to retrieve the ID token from the identity provider 150.

Next, at operation 425, the application proxy 110 sets one or more tokens and redirects the user agent 107 to resubmit the request. In an embodiment, the application proxy 110 sets an identity provider authentication token, which can be a self-contained token or a reference token, that can be used by the application proxy 110 for verifying that the user has successfully authenticated according to the identity provider authentication requirement; and sets an application proxy authentication token, which can be a self-contained token or a reference token, which can be used to verify whether the user has successfully authenticated according to the application proxy authentication requirement.

Going back to operation 410, if the request is associated with a valid token that indicates the user has authenticated to the identity provider, then flow moves to operation 430. At operation 430, the application proxy 110 enforces the access rule(s) of the access policy that is configured for the application 130. These rule(s) can be based on attributes associated with the user, the request, and/or the application. These rules can be identity-based or non-identity based. The identity-based rule(s) are based on the identity of the user (e.g., provided by the IdP 150) such as a username, email address, etc., and may, for example, determine whether the identified user has access rights to the application 130. The non-identity rule(s) are not based on the identity of the user and may, for example, specify rules for accessing or not accessing the application 130. Example non-identity rules include rules based on location (e.g., geographic region such as the country of origin), device posture, time of request, type of request, IP address, MFA status, MFA type, type of client device, type of user agent, whether the request is associated with an access agent on the client device, the type of authentication method(s) that are acceptable for satisfying the application proxy authentication requirement, whether a phishing-resistant authentication method is required (e.g., a passkey password authentication method) for the application proxy authentication requirement, the type of phishing-resistant authentication method that is acceptable for satisfying the application proxy authentication requirement, and/or other layer 3, layer 4, and/or layer 7 policies. In this example, the access rule(s) include an application proxy authentication requirement that specifies authentication method(s) acceptable for satisfying an authentication requirement enforced by the application proxy 110 for accessing the application 130.

Figure 5:
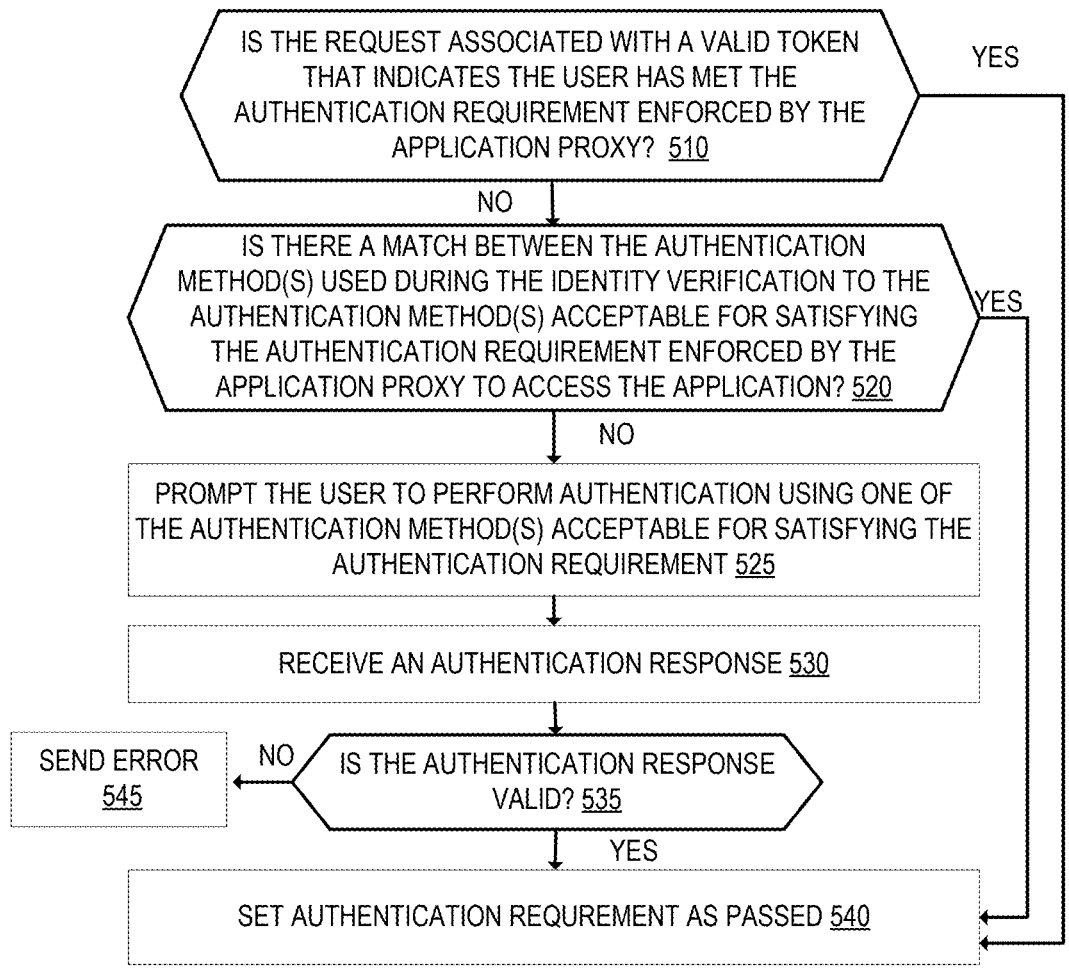
FIG. 5 is a flow diagram that illustrates exemplary operations for enforcing an IdP-agnostic authentication rule according to an embodiment.

The operations for enforcing the access rule(s) are different for different rules. FIG. 5 is a flow diagram that illustrates exemplary operations for enforcing an IdP-agnostic authentication rule according to an embodiment. The operations of FIG. 5 can be performed during operation 430, for example.

At operation 510, the application proxy 110 determines whether the request is associated with a valid token that indicates that the user has met the authentication requirement enforced by the application proxy 110. For example, the application proxy 110 looks for an application proxy authentication token in the request (e.g., in a cookie or a request header). If such a token is included in the request, the application proxy 110 determines whether the token is valid and whether the application proxy authentication requirement has been met. For instance, in the case the token is a reference token that contains an identifier that uniquely identifies the user agent 107, the application proxy 110 looks up the application proxy authentication information for the unique identifier. The application proxy authentication information may include information regarding whether the application proxy authentication requirement is currently satisfied and an expiration value. As another example, in a case where the client device includes an access agent 109 that transmits a unique agent identifier with the request, that identifier can be associated with the application proxy authentication information. In such a case, the application proxy 110 looks up the application proxy authentication information for the unique agent identifier. If the request is associated with a valid token that indicates that the user has met the authentication requirement enforced by the application proxy 110, then the application proxy 110 sets the application proxy authentication requirement as passed in operation 540. If the request is not associated with a valid token that indicates that the user has met the authentication requirement enforced by the application proxy 110, then operation 520 is performed.

At operation 520, the application proxy 110 determines whether the authentication method(s) used during the identity verification (as indicated in the authentication response that was generated by the identity provider) match the authentication method(s) acceptable for satisfying the application proxy authentication requirement enforced by the application proxy 110 for accessing the application 130. For example, the application proxy 110 compares the authentication method information in the authentication response (e.g., in the amr claim) to the authentication method(s) acceptable for satisfying the application proxy authentication requirement. There may be multiple authentication methods acceptable for satisfying the application proxy authentication requirement, each of which separately can satisfy the requirement. For instance, the application may be configured to allow a TOTP authentication method or a hardware-secured key authentication method. If either of these authentication methods were used during the identity verification (as indicated in the authentication response), then there is a match. If none of these authentication methods were used during the identity verification, then there is not a match. If there is a match between the authentication method(s) used during the identity verification to the identity provider 150 and the authentication method(s) that are acceptable for satisfying the application proxy authentication requirement to access the application 130, the application proxy 110 does not cause the user to be prompted to perform the authentication method(s) again at the application proxy 110. If there is a match, then operation 540 is performed where the application proxy 110 sets the application proxy authentication requirement as being passed and may update the application proxy authentication information to indicate that the application proxy authentication requirement has been passed. As noted earlier, the application proxy authentication information can be associated with the unique user agent identifier and/or the unique access agent identifier. If there is not a match, then operation 525 is performed.

At operation 525, the application proxy 110 prompts the user to perform an authentication using one of the authentication method(s) acceptable for satisfying the application proxy authentication requirement enforced by the application proxy 110 for accessing the application 130. For example, the application proxy 110 causes an authentication challenge to be issued to the user agent 107. The authentication method that is used can depend on the configuration of the application 130. If there are multiple authentication methods that are configured, the application proxy 110 can prompt the user to select one of the authentication methods to perform. The user agent 107 transmits an authentication challenge response to the application proxy 110, which is received at operation 530. The application proxy 110 determines whether the authentication response is valid at operation 535. If it is valid, then operation 540 is performed where the application proxy 110 sets the application proxy authentication requirement as being passed and may update the application proxy authentication information to indicate that the application proxy authentication requirement has been passed. If the authentication response is not valid, then operation 545 is performed where the application proxy 110 sends an error to the user agent 107.

The way the authentication method is performed is different depending on the method, and the operations for verifying the authentication response depends on the authentication method being used. For example, if the authentication method is an email-based OTP, the application proxy 110 may cause an email to be sent that includes an OTP and provide a page for the user to submit the OTP. The application proxy 110 verifies that the OTP submitted is the one sent over email. As another example, if the authentication method is an authenticator application TOTP, the application proxy 110 causes a page to be sent to the client device for the user to submit a TOTP. The application proxy 110 generates a TOTP using the stored secret key and compares the generated TOTP with the submitted TOTP for verification. As another example, if the authentication method is a security key (e.g., using WebAuthn) method, the application proxy 110 generates an authentication challenge and prompts the prompts the user to interact with the security key (e.g., a physical interaction such as a tough of the key) to cause the security key to sign the authentication challenge. The application proxy 110 receives the signed authentication challenge and verifies it (e.g., verifies the signature and the challenge). As another example, if the authentication method is a biometric authentication method (e.g., using WebAuthn), the application proxy 110 generates an authentication challenge and prompts the user to provide a biometric (e.g., a fingerprint, face scan, PIN) to cause the client device authenticator to sign the authentication challenge. The application proxy 110 receives the signed authentication challenge and verifies it (e.g., verifies the signature and the challenge). As another example, if the authentication method is a passkey password authentication, the application proxy 110 generates an authentication challenge and prompts the user to submit a passkey to cause the client device authenticator to sign the authentication challenge and transmit it to the application proxy 110. The application proxy 110 receives the signed authentication challenge and verifies it (e.g., verifies the signature and the challenge).

Referring to FIG. 4, there may be other access rule(s) that need to be passed prior to allowing access. If the applicable access rule(s) are passed at operation 435, then the application proxy 110 allows access to the application 130. For instance, the application proxy 110 transmits the request to the origin server for the application 130 at operation 440. The application proxy 110 may receive a response from the origin server and transmit the response to the user agent 107. If the access rule(s) are not passed at operation 435, then operation 445 is performed where the application proxy 110 blocks the traffic.

Figure 6:
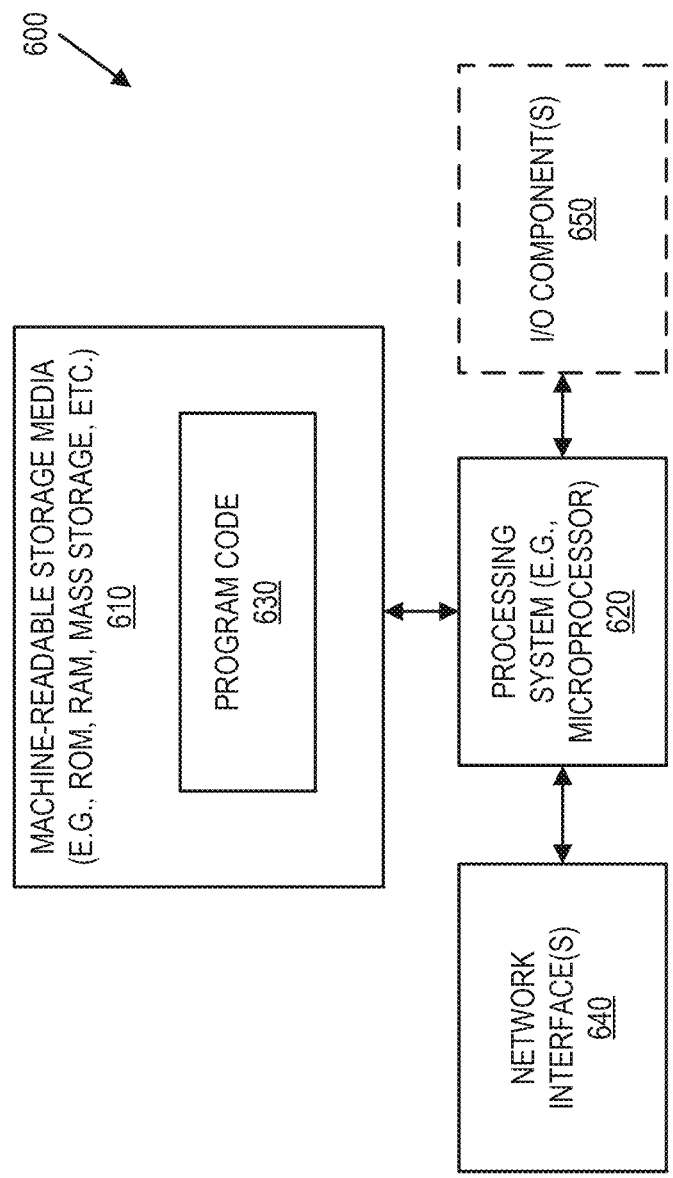
FIG. 6 illustrates a block diagram for an exemplary data processing system that may be used in some embodiments.

FIG. 6 illustrates a block diagram for an exemplary data processing system 600 that may be used in some embodiments. One or more such data processing systems 600 may be utilized to implement the embodiments and operations described with respect to the application proxy 110 and/or the configuration server 140. Data processing system 600 includes a processing system 620 (e.g., one or more processors and connected system components such as multiple connected chips).

The data processing system 600 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 610 (e.g., magnetic disks, optical disks, read only memory (ROM), flash memory devices, phase change memory) and machine-readable transmission media (also called a carrier) (e.g., electrical, optical, radio, acoustical or other form of propagated signals-such as carrier waves, infrared signals), which is coupled to the processing system 620. For example, the depicted machine-readable storage media 610 may store program code 630 that, when executed by the processing system 620, causes the data processing system 600 to execute any of the operations described herein.

The data processing system 600 also includes one or more network interfaces 640 (e.g., a wired and/or wireless interfaces) that allows the data processing system 600 to transmit data and receive data from other computing devices, typically across one or more networks (e.g., Local Area Networks (LANs), the Internet, etc.). The data processing system 600 may also include one or more input or output ("I/O") components 650 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 600, and, in certain embodiments, fewer components than that shown in One or more buses may be used to interconnect the various components shown in FIG. 6.

The techniques shown in the figures can be implemented using code and data stored and executed on one or more electronic devices (e.g., a client device, application proxy, configuration server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals-such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the preceding description, numerous specific details are set forth to provide a more thorough understanding of the present invention. It will be appreciated, however, by one skilled in the art that embodiments may be practiced without such specific details. In other instances, control structures, gate level circuits and full software instruction sequences have not been shown in detail in order not to obscure embodiments. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
receiving, at an intermediary server that operates an application proxy, a first access request from a first user agent, wherein the first access request is for access to a first application, wherein a first access policy associated with the first application specifies a first set of one or more authentication methods acceptable for satisfying a first authentication requirement enforced by the application proxy to access the first application;
redirecting the first user agent to submit a first authentication request to a first identity provider for identity verification against a first user directory;
receiving, from the first user agent, a first authentication response that was generated by the first identity provider that establishes that a first user has successfully authenticated to the first identity provider, wherein the first authentication response includes information that specifies a second set of one or more authentication methods used during the identity verification against the first user directory, and wherein the first authentication requirement is enforced independently of any second authentication requirement at the first identity provider;
determining that the second set of one or more authentication methods matches to the specified first set of one or more authentication methods acceptable for satisfying the first authentication requirement enforced by the application proxy, and responsive to this determination, not prompting the first user to perform any of the specified first set of one or more authentication methods acceptable for satisfying the first authentication requirement;
allowing the first user agent to access the first application;
receiving, at the intermediary server that operates the application proxy, a second access request from a second user agent, wherein the second access request is for access to a second application, wherein a second access policy associated with the second application specifies a third set of one or more authentication methods acceptable for satisfying a third authentication requirement enforced by the application proxy to access the second application;
redirecting the second user agent to submit a second authentication request to a second identity provider for identity verification against a second user directory;
receiving, from the second user agent, a second authentication response that was generated by the second identity provider that establishes that a second user has successfully authenticated to the second identity provider, wherein the second authentication response includes information that specifies a fourth set of one or more authentication methods used during the identity verification against the second user directory, and wherein the third authentication requirement is enforced independently of any fourth authentication requirement at the second identity provider;
determining that the fourth set of one or more authentication methods does not match to the specified third set of one or more authentication methods acceptable for satisfying the third authentication requirement enforced by the application proxy, and responsive to this determination, causing an authentication challenge to be transmitted to the second user agent for the second user to perform one of the specified third set of one or more authentication methods acceptable for satisfying the third authentication requirement;
receiving an authentication challenge response from the second user agent;
verifying the authentication challenge response; and
allowing the second user agent to access the second application.

2. The method of claim 1, wherein prior to allowing the first user agent to access the first application,
setting one or more tokens that indicate that the first user has successfully authenticated and is authorized to access the first application including satisfying the first authentication requirement;
redirecting the first user agent to re-submit the first access request with the set of one or more tokens;
receiving the first access request with the set of tokens; and
verifying the set of tokens.

3. The method of claim 1, wherein the first set of one or more authentication methods include one or more authentication methods that require something the first user has and/or something the first user is.

4. The method of claim 3, wherein the one or more authentication methods that require something the first user has includes one or more of: an email-based one-time password (OTP), a text-based OTP, an authenticator application time-based one-time password, and a hardware token OTP.

5. The method of claim 1, wherein the information that specifies the second set of one or more authentication methods used during the identity verification against the second user directory is within an authentication methods reference (amr) claim of the first authentication response.

6. The method of claim 1, further comprising:

receiving, at the intermediary server that operates the application proxy, a third access request from a third user agent, wherein the third access request is for access to a third application, wherein a third access policy associated with the third application specifies a fifth set of one or more authentication methods acceptable for satisfying a fifth authentication requirement enforced by the application proxy to access the third application;

redirecting the third user agent to submit a third authentication request to a third identity provider for identity verification against a third user directory;

receiving, from the third user agent, a third authentication response that was generated by the third identity provider that establishes that a third user has successfully authenticated to the third identity provider, wherein the third authentication response includes information that specifies a sixth set of one or more authentication methods used during the identity verification against the third user directory, and wherein the fifth authentication requirement is enforced independently of any sixth authentication requirement at the third identity provider; and determining that the third user has not enrolled in the specified fifth set of one or more authentication methods, and responsive to this determination, prompting the third user to enroll in one or more of the specified fifth set of one or more authentication methods.

7. The method of claim 1, wherein the application proxy generates the first authentication request and the second authentication request for transmission to the first identity provider and the second identity provider, respectively.

8. A non-transitory computer-readable storage medium that, when executed by a processing system of an intermediary server, causes said intermediary server to perform operations, comprising:

receiving, at the intermediary server that operates an application proxy, a first access request from a first user agent, wherein the first access request is for access to a first application, wherein a first access policy associated with the first application specifies a first set of one or more authentication methods acceptable for satisfying a first authentication requirement enforced by the application proxy to access the first application;

redirecting the first user agent to submit a first authentication request to a first identity provider for identity verification against a first user directory;

receiving, from the first user agent, a first authentication response that was generated by the first identity provider that establishes that a first user has successfully authenticated to the first identity provider, wherein the first authentication response includes information that specifies a second set of one or more authentication methods used during the identity verification against the first user directory, and wherein the first authentication requirement is enforced independently of any second authentication requirement at the first identity provider;

determining that the second set of one or more authentication methods matches to the specified first set of one or more authentication methods acceptable for satisfying the first authentication requirement enforced by the application proxy, and responsive to this determination, not prompting the first user to perform any of the specified first set of one or more authentication methods acceptable for satisfying the first authentication requirement;

allowing the first user agent to access the first application;

receiving, at the intermediary server that operates the application proxy, a second access request from a second user agent, wherein the second access request is for access to a second application, wherein a second access policy associated with the second application specifies a third set of one or more authentication methods acceptable for satisfying a third authentication requirement enforced by the application proxy to access the second application;

redirecting the second user agent to submit a second authentication request to a second identity provider for identity verification against a second user directory;

receiving, from the second user agent, a second authentication response that was generated by the second identity provider that establishes that a second user has successfully authenticated to the second identity provider, wherein the second authentication response includes information that specifies a fourth set of one or more authentication methods used during the identity verification against the second user directory, and wherein the third authentication requirement is enforced independently of any fourth authentication requirement at the second identity provider;

determining that the fourth set of one or more authentication methods does not match to the specified third set of one or more authentication methods acceptable for satisfying the third authentication requirement enforced by the application proxy, and responsive to this determination, causing an authentication challenge to be transmitted to the second user agent for the second user to perform one of the specified third set of one or more authentication methods acceptable for satisfying the third authentication requirement;

receiving an authentication challenge response from the second user agent;

verifying the authentication challenge response; and allowing the second user agent to access the second application.

9. The non-transitory computer-readable storage medium of claim 8, wherein prior to allowing the first user agent to access the first application, setting one or more tokens that indicate that the first user has successfully authenticated and is authorized to access the first application including satisfying the first authentication requirement;

redirecting the first user agent to re-submit the first access request with the set of one or more tokens;

receiving the first access request with the set of tokens; and verifying the set of tokens.

10. The non-transitory computer-readable storage medium of claim 8, wherein the first set of one or more authentication methods include one or more authentication methods that require something the first user has and/or something the first user is.

11. The non-transitory computer-readable storage medium of claim 10, wherein the one or more authentication methods that require something the first user has includes one or more of: an email-based one-time password (OTP), a text-based OTP, an authenticator application time-based one-time password, and a hardware token OTP.

12. The non-transitory computer-readable storage medium of claim 8, wherein the information that specifies the second set of one or more authentication methods used during the identity verification against the second user directory is within an authentication methods reference (amr) claim of the first authentication response.

13. The non-transitory computer-readable storage medium of claim 8, wherein the operations further comprise:
receiving, at the intermediary server that operates the application proxy, a third access request from a third user agent, wherein the third access request is for access to a third application, wherein a third access policy associated with the third application specifies a fifth set of one or more authentication methods acceptable for satisfying a fifth authentication requirement enforced by the application proxy to access the third application;
redirecting the third user agent to submit a third authentication request to a third identity provider for identity verification against a third user directory;
receiving, from the third user agent, a third authentication response that was generated by the third identity provider that establishes that a third user has successfully authenticated to the third identity provider, wherein the third authentication response includes information that specifies a sixth set of one or more authentication methods used during the identity verification against the third user directory, and wherein the fifth authentication requirement is enforced independently of any sixth authentication requirement at the third identity provider; and
determining that the third user has not enrolled in the specified fifth set of one or more authentication methods, and responsive to this determination, prompting the third user to enroll in one or more of the specified fifth set of one or more authentication methods.

14. The non-transitory computer-readable storage medium of claim 8, wherein the application proxy generates the first authentication request and the second authentication request for transmission to the first identity provider and the second identity provider, respectively.

15. An intermediary server, comprising:
a processing system; and
a non-transitory machine-readable storage medium coupled to the processing system, wherein the non-transitory machine-readable storage medium stores instructions that, when executed by the processing system, causes the intermediary server to perform operations including:
receiving, at the intermediary server that operates an application proxy, a first access request from a first user agent, wherein the first access request is for access to a first application, wherein a first access policy associated with the first application specifies a first set of one or more authentication methods acceptable for satisfying a first authentication requirement enforced by the application proxy to access the first application,
redirecting the first user agent to submit a first authentication request to a first identity provider for identity verification against a first user directory,
receiving, from the first user agent, a first authentication response that was generated by the first identity provider that establishes that a first user has successfully authenticated to the first identity provider, wherein the first authentication response includes information that specifies a second set of one or more authentication methods used during the identity verification against the first user directory, and wherein the first authentication requirement is enforced independently of any second authentication requirement at the first identity provider,
determining that the second set of one or more authentication methods matches to the specified first set of one or more authentication methods acceptable for satisfying the first authentication requirement enforced by the application proxy, and responsive to this determination, not prompting the first user to perform any of the specified first set of one or more authentication methods acceptable for satisfying the first authentication requirement,
allowing the first user agent to access the first application,
receiving, at the intermediary server that operates the application proxy, a second access request from a second user agent, wherein the second access request is for access to a second application, wherein a second access policy associated with the second application specifies a third set of one or more authentication methods acceptable for satisfying a third authentication requirement enforced by the application proxy to access the second application,
redirecting the second user agent to submit a second authentication request to a second identity provider for identity verification against a second user directory,
receiving, from the second user agent, a second authentication response that was generated by the second identity provider that establishes that a second user has successfully authenticated to the second identity provider, wherein the second authentication response includes information that specifies a fourth set of one or more authentication methods used during the identity verification against the second user directory, and wherein the third authentication requirement is enforced independently of any fourth authentication requirement at the second identity provider,
determining that the fourth set of one or more authentication methods does not match to the specified third set of one or more authentication methods acceptable for satisfying the third authentication requirement enforced by the application proxy, and responsive to this determination, causing an authentication challenge to be transmitted to the second user agent for the second user to perform one of the specified third set of one or more authentication methods acceptable for satisfying the third authentication requirement,
receiving an authentication challenge response from the second user agent,
verifying the authentication challenge response, and
allowing the second user agent to access the second application.

16. The intermediary server of claim 15, wherein prior to allowing the first user agent to access the first application,
setting one or more tokens that indicate that the first user has successfully authenticated and is authorized to access the first application including satisfying the first authentication requirement;
redirecting the first user agent to re-submit the first access request with the set of one or more tokens;
receiving the first access request with the set of tokens; and
verifying the set of tokens.

17. The intermediary server of claim 15, wherein the first set of one or more authentication methods include one or more authentication methods that require something the first user has and/or something the first user is.

18. The intermediary server of claim 17, wherein the one or more authentication methods that require something the first user has includes one or more of: an email-based one-time password (OTP), a text-based OTP, an authenticator application time-based one-time password, and a hardware token OTP.

19. The intermediary server of claim 15, wherein the information that specifies the second set of one or more authentication methods used during the identity verification against the second user directory is within an authentication methods reference (amr) claim of the first authentication response.

20. The intermediary server of claim 15, wherein the operations further comprise:
 receiving, at the intermediary server that operates the application proxy, a third access request from a third user agent, wherein the third access request is for access to a third application, wherein a third access policy associated with the third application specifies a fifth set of one or more authentication methods acceptable for satisfying a fifth authentication requirement enforced by the application proxy to access the third application;
 redirecting the third user agent to submit a third authentication request to a third identity provider for identity verification against a third user directory;
 receiving, from the third user agent, a third authentication response that was generated by the third identity provider that establishes that a third user has successfully authenticated to the third identity provider, wherein the third authentication response includes information that specifies a sixth set of one or more authentication methods used during the identity verification against the third user directory, and wherein the fifth authentication requirement is enforced independently of any sixth authentication requirement at the third identity provider; and
 determining that the third user has not enrolled in the specified fifth set of one or more authentication methods, and responsive to this determination, prompting the third user to enroll in one or more of the specified fifth set of one or more authentication methods.

21. The intermediary server of claim 15, wherein the application proxy generates the first authentication request and the second authentication request for transmission to the first identity provider and the second identity provider, respectively.

* * * * *